Sept. 21, 1965  R. D. LOWRY ETAL  3,206,906

METHOD FOR PREPARING A DISPLAY PACKAGE

Original Filed Dec. 30, 1960

INVENTOR
ROBERT D. LOWRY,
WYLIE C. KIRKPATRICK,
JOHN W. HARRISON

BY  C. E. Parker

ATTORNEY

3,206,906
METHOD FOR PREPARING A DISPLAY PACKAGE
Robert D. Lowry, Winchester, Mass., Wylie C. Kirkpatrick, Riverside, Greenwich, Conn., and John W. Harrison, Winchester, Mass., assignors to W. R. Grace & Co., Cambridge, Mass., a corporation of Connecticut
Original application Dec. 30, 1960, Ser. No. 79,611, now Patent No. 3,076,542, dated Feb. 5, 1963. Divided and this application Feb. 1, 1962, Ser. No. 256,211
3 Claims. (Cl. 53—3)

This application is a division of copending patent application, Serial Number 79,611 filed December 30, 1960, and subsequently issued as U.S. Patent No. 3,076,542.

This invention relates to a method of packaging and more particularly to the packaging of an object within a sheet of heat shrinkable film which is attached to or locked beneath a stiff sheet of backing material.

It is well known to package objects between a backing board and a rigid transparent, thermoplastic bubble or blister. The so-called blister package provides a transparent protective covering for the enclosed object while the backing board provides further physical protection and also serves to carry messages and decorations. Blister packages, however, require relatively thick plastic materials to form the blister, which plastic materials must be preformed and are relatively expensive. A problem also arises in attaching the bubble or blister to the backing material, and in most cases, it is necessary to perform a separate loading and gluing operation. Our invention produces a package which possesses all of the advantages of the blister package and none of its disadvantages.

Accordingly it is an object of this invention to provide a novel package in which the object is placed upon a stiff backing board and covered with a transparent plastic covering.

It is also an object of this invention to provide a novel package that is simple to construct and requires inexpensive materials for its manufacture.

A further object is to provide a package which affords the appeal and protection of a blister package but does not require a thick preformed plastic blister.

Another object is to provide a package in which no adhesive or mechanical fastening is required on the front or upper surface of said package.

It is also an object to provide a package wherein the product is covered with a transparent plastic material which closely conforms to the product and which material also serves to attach the product to the backing board.

These and other objects of the present invention will appear more fully in the following specification and claims taken in conjunction with the accompanying drawings in which:

Figure 1:
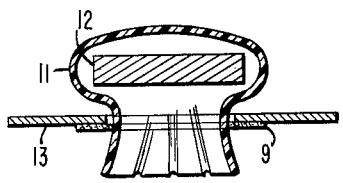
FIGURES 1 and 2 are cross-sectional elevational views showing the formation of the package of this invention.
Figure 2:

Referring to FIGURES 1 and 2, there is shown a flexible sheet of heat shrinkable film 11, a product 12 to be packaged, and a backing board 13. The backing board is a rectangular section of stiff paperboard which has a circular opening or aperture cut out at approximately the center of the backing board which opening is smaller than the product being packaged. The sheet of heat shrinkable film 11 is placed over the top of the product and drawn down and around the product 12. The edges of said film sheet extending below the product are gathered and drawn through the opening in the backing board. The product is pulled over the opening in the backing board as the film edges are drawn through the opening. The excess film below the backing board is then secured to the underside of the backing board by means of an adhesive 9. Heat is applied to that portion of the sheet of film covering the product causing it to shrink producing a tight, wrinkle-free package.

Figure 3:
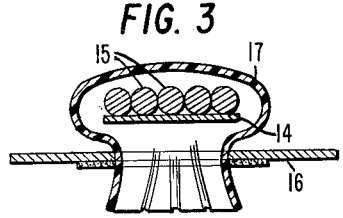
FIGURE 3 is a cross-sectional elevational view of the package of this invention modified to accommodate small objects.

When it is desired to package a number of small objects, which objects might pass through the opening in the backing board, a supplementary backing board 14, larger than the opening, may be employed as shown in FIGURE 3. The supplementary backing board is placed under the objects 15 and above the opening in the backing board 16. The film sheet 17, as before, is placed over and drawn about the objects and about the supplementary backing board and the peripheral edges of the film sheet extending below the product and supplementary backing board are drawn through the opening in the backing board and secured to the underside thereof and that portion of the film covering the objects is heat shrunk.

While the above examples employed adhesives to secure the film to the underside of the backing board, it is also possible to employ mechanical fastenings, heat seals, etc. to secure the film.

Figure 4:
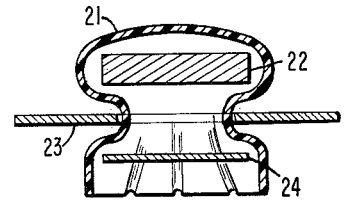
FIGURES 4 and 5 are cross-sectional elevational views showing the formation of a modified package of this invention.
Figure 5:
Figure 6:
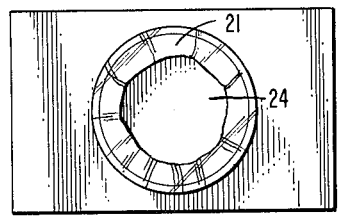
FIGURE 6 is a bottom plan view of the package of FIGURE 5.

FIGURES 4, 5 and 6 disclose a modified package of this invention which does not require adhesives or mechanical fastenings to secure the shrinkable film to the underside of the backing board. A sheet of heat shrinkable film 21 is wrapped over and around the sides of the product 22 and the film edges extending below the product are drawn through the aperture of the backing board 23 as before. A locking member in the form of a disc of backing material 24 slightly larger than the aperture is positioned within the film edges and against the undersurface of the backing board so as to cover the aperture. The film extending below the disc is then shrunk by the application of heat. As the film shrinks the peripheral edge of the film sheet becomes smaller causing the film to be drawn inwardly over and against the undersurface of the disc as is shown in FIGURE 6. The film edges thereby become locked about the disc holding the disc in place and against the backing board. The portion of the film surrounding the product is lightly shrunk to tighten the package and remove any wrinkles therefrom.

Figure 7:
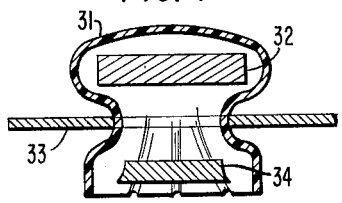
FIGURES 7 and 8 are cross-sectional elevational views showing the formation of another modified package of this invention.
Figure 8:

Another variation of the package of this invention is shown in FIGURES 7 and 8 wherein the locking member shown in the previous example has been modified. In place of the disc there is employed a shallow plug which fits tightly into the aperture of the backing board. The plug is designed so that it is small enough at one end to pass into the aperture of the backing board but large enough at the opposite end so that it will not pass completely through. It is desirable that the plug be shaped so that it may be forced into the aperture and be held in place by means of a friction fit. In FIGURES 7 and 8 a sheet of heat shrinkable film 31 is placed over the product 32 and the edges of the film are drawn around and under the product and through the aperture in a backing board 33. The film material drawn through the aperture is then flared out evenly around the edge of the aperture and under the backing board. A plug 34, having an outwardly flaring sidewall, is then inserted into the aperture locking the film between the edge of the aperture and the plug. The top portion of the film covering the product is lightly shrunk to produce a neat, tight package. While not necessary, the film extending below the backing board may be heat shrunk causing the film edges to be drawn over and against the undersurface of the plug and to become locked thereto. Additionally, as the film shrinks it also thickens resulting in a thickened portion of film being located at the undersurface of the backing board adjacent to the line where the plug enters the aperture in the backing board. This thickened area functions to act as a further aid in preventing the film from being drawn through the aperture.

It is possible to perform the shrink operations in the above package assembly in one single step by passing the package through a hot air shrink tunnel. It is possible to perform this overall shrink in one operation because the film is held tightly in the aperture of the backing board by the plug.

The stiff backing material employed as the backing board may have any geometric shape and may be composed of any material that has sufficient rigidity and will not be adversely affected by the temperatures employed in shrinking the film material. The opening in the backing board while disclosed in the examples as circular may have other geometric shapes, e.g., rectangular, etc. The locking member and plug may be modified to conform to the geometric shape of the opening in the backing board or may have a different shape from said opening so long as the locking member is greater in at least one dimension than said opening and so long as the plug may wedge into said opening.

Any heat shrinkable material that will not melt or decompose under the temperatures required for shrinking may be used. Examples of such materials include but are not limited to irradiated, biaxially oriented polyethylene, such as that described in U.S. Patent 2,877,500 to Rainer et al., oriented polypropylene, oriented copolymers of vinylidene chloride, etc.

The invention described in detail in the foregoing specification is subject to changes and modifications without departing from the principle and spirit thereof. The terminology used is for purpose of description and not of limitation, the scope of the invention being defined in the claims.

We claim:

1. A method of packaging a product which comprises placing a sheet of heat shrinkable film over said product, drawing the film edges around and under said product, positioning the thus wrapped product over a backing member having an opening therein smaller than said product, drawing the film edges through said openings so that said product is positioned above and adjacent said opening, flaring the film edges outwardly from the edges of said opening, positioning a locking member within said film edges, said locking member being slightly larger in at least one dimension than said opening, subjecting said film edges to sufficient heat to shrink the film edges about the edges of the locking member thus locking said film in position, and heat shrinking the film over said product to cause said film to lightly conform to said product and to tightly hold said product against said backing member.

2. The method of claim 1 wherein said locking member is wedge shaped and the narrow end of said locking member is wedged into said opening prior to heat shrinking the film edges.

3. The method of claim 1 wherein said heat shrinking steps are performed simultaneously.

References Cited by the Examiner
UNITED STATES PATENTS

| | | | |
|---|---|---|---|
| 2,151,503 | 5/39 | Dowst | 206—45.19 |
| 2,931,493 | 4/60 | Pfohl | 206—78 |
| 2,931,494 | 4/60 | Pfohl | 206—78 |
| 2,931,495 | 4/60 | Stratton | 206—80 |
| 3,018,879 | 1/62 | Crane. | |
| 3,076,542 | 2/63 | Lowry et al. | 206—78 |

GRANVILLE Y. CUSTER, JR., *Primary Examiner.*
BERNARD STICKNEY, *Examiner.*

UNITED STATES PATENT OFFICE
CERTIFICATE OF CORRECTION

Patent No. 3,206,906                       September 21, 1965

Robert D. Lowry et al.

It is hereby certified that error appears in the above numbered patent requiring correction and that the said Letters Patent should read as corrected below.

Column 4, line 18, for "lightly" read -- tightly --.

Signed and sealed this 22nd day of March 1966.

(SEAL)
Attest:

ERNEST W. SWIDER                           EDWARD J. BRENNER
Attesting Officer                             Commissioner of Patents